United States Patent
Ota et al.

(10) Patent No.: US 11,006,010 B2
(45) Date of Patent: May 11, 2021

(54) PRINTING APPARATUS THAT INCLUDES A PIVOTING DISPLAY THAT CAN BE OPENED AND CLOSED

(71) Applicant: CANON KABUSHIKI KAISHA, Tokyo (JP)

(72) Inventors: Yasuhiro Ota, Chigasaki (JP); Yasuhito Tsubakimoto, Tokyo (JP); Kaneto Tokuyama, Tokyo (JP); Kosuke Umehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/834,101

(22) Filed: Mar. 30, 2020

(65) Prior Publication Data
US 2020/0322493 A1 Oct. 8, 2020

(30) Foreign Application Priority Data
Apr. 4, 2019 (JP) .............................. JP2019-072169

(51) Int. Cl.
| | |
|---|---|
| *B41J 29/13* | (2006.01) |
| *H04N 1/00* | (2006.01) |
| *B41J 29/393* | (2006.01) |
| *B41J 29/02* | (2006.01) |

(52) U.S. Cl.
CPC .......... *H04N 1/00496* (2013.01); *B41J 29/02* (2013.01); *B41J 29/393* (2013.01)

(58) Field of Classification Search
CPC ...... H04N 1/00496; B41J 29/02; B41J 29/393
USPC .......................... 358/1.1–1.18, 402; 347/108
See application file for complete search history.

(56) References Cited

U.S. PATENT DOCUMENTS

| | | | | |
|---|---|---|---|---|
| 6,469,802 | B1 * | 10/2002 | Yamaguchi | ............ F16M 11/10 16/337 |
| 2005/0205735 | A1 * | 9/2005 | Ichikawa | ............. G07G 1/0018 248/292.12 |
| 2006/0198094 | A1 * | 9/2006 | Kano | ................... G07G 1/0018 361/679.09 |
| 2007/0024924 | A1 * | 2/2007 | Ikeno | ................. H04N 1/00493 358/474 |
| 2019/0339735 | A1 * | 11/2019 | Krumholz | ........ G07B 17/00193 |

FOREIGN PATENT DOCUMENTS

JP 2006-168173 A 6/2006

OTHER PUBLICATIONS

U.S. Appl. No. 16/826,609, filed Mar. 23, 2020 (first named inventor: Kosuke Umehara).

* cited by examiner

*Primary Examiner* — Gabriel I Garcia
(74) *Attorney, Agent, or Firm* — Venable LLP (57) ABSTRACT

A printing apparatus comprises a main body, an operation panel configured to pivot about a pivot shaft relative to the main body, a stopper that has one end pivotably connected to the operation panel, and has a cam face on a surface thereof, a guide member that is provided on the main body, has a first guide face and a second guide face, and is configured to guide the stopper such that the stopper is slidable in a longitudinal direction, a first pressing member configured to press the stopper against the first guide face while being in contact with the cam face of the stopper, and a second pressing member configured to come into contact with a face of the stopper different from the cam face, and press the stopper against the second guide face.

6 Claims, 9 Drawing Sheets

PRINTING APPARATUS THAT INCLUDES A PIVOTING DISPLAY THAT CAN BE OPENED AND CLOSED

BACKGROUND OF THE INVENTION

Field of the Invention

The present invention relates to a printing apparatus that includes a display operating unit that can be opened and closed.

Description of the Related Art

Conventionally, printing apparatuses such as printers generally include a display operating unit that is to be operated by a user. Some of such display operating units are configured such that the tilt angle thereof is changeable in order to improve operability or improve the visibility of a display unit.

For example, Japanese Patent Laid-Open No. 2006-168173 discloses a multi-functional printer apparatus in which an engagement claw that is formed on a display unit can be fitted into recesses between a plurality of ridges that are formed on a receiver, and thus the display unit can be tilted at any of a plurality of angles.

However, in the mechanism disclosed in the Japanese Patent Laid-Open No. 2006-168173, the engagement claw and the ridges are configured to slide on each other. Therefore, if the user repeatedly changes the tilt angle of the display unit, the shapes of the engagement claw and the ridges will change due to wear. If engagement portions wear in such a manner, a problem occurs in which an operation force that is to be applied to change the tilt angle of the display unit changes or operability is degraded.

SUMMARY OF THE INVENTION

The present invention has been made in view of the above-described problems, and provides a printing apparatus in which the operation force to be applied to the display operating unit and the operability thereof are less likely to change.

According to a first aspect of the present invention, there is provided a printing apparatus comprising: a main body; an operation panel configured to pivot about a pivot shaft relative to the main body; a stopper that has one end pivotably connected to the operation panel, and has a cam face on a surface thereof; a guide member that is provided on the main body, has a first guide face and a second guide face that is different from the first guide face, and is configured to guide the stopper such that the stopper is slidable in a longitudinal direction of the stopper; a first pressing member configured to press the stopper against the first guide face while being in contact with the cam face of the stopper; and a second pressing member configured to come into contact with a face of the stopper different from the cam face, and press the stopper against the second guide face.

According to a second aspect of the present invention, there is provided a printing apparatus comprising: a main body; an operation panel configured to pivot about a pivot shaft relative to the main body; a slide member that is disposed so as to be slidable relative to the main body, and supports the operation panel; and a holding mechanism that holds the slide member at a plurality of positions in a sliding direction, wherein the holding mechanism has a cam face formed on the slide member, and a first pressing member that is biased toward the cam face, and the holding mechanism further has a second pressing member that is configured to apply a pressing force in a direction that is different from a pressing direction of the first pressing member, thereby braking the slide member moving in the sliding direction.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The following describes a recording apparatus (a printing apparatus) according to a first embodiment of the present invention. For the purpose of description, the horizontal scanning direction of a carriage on which the recording head of the printing apparatus is mounted is defined as an X direction. The direction in which a recording medium is conveyed is defined as a Y direction. A direction that is orthogonal to a plane that is formed by the horizontal scanning direction (the X direction) and the conveyance direction (the Y direction) is defined as a Z direction.

Figure 1:
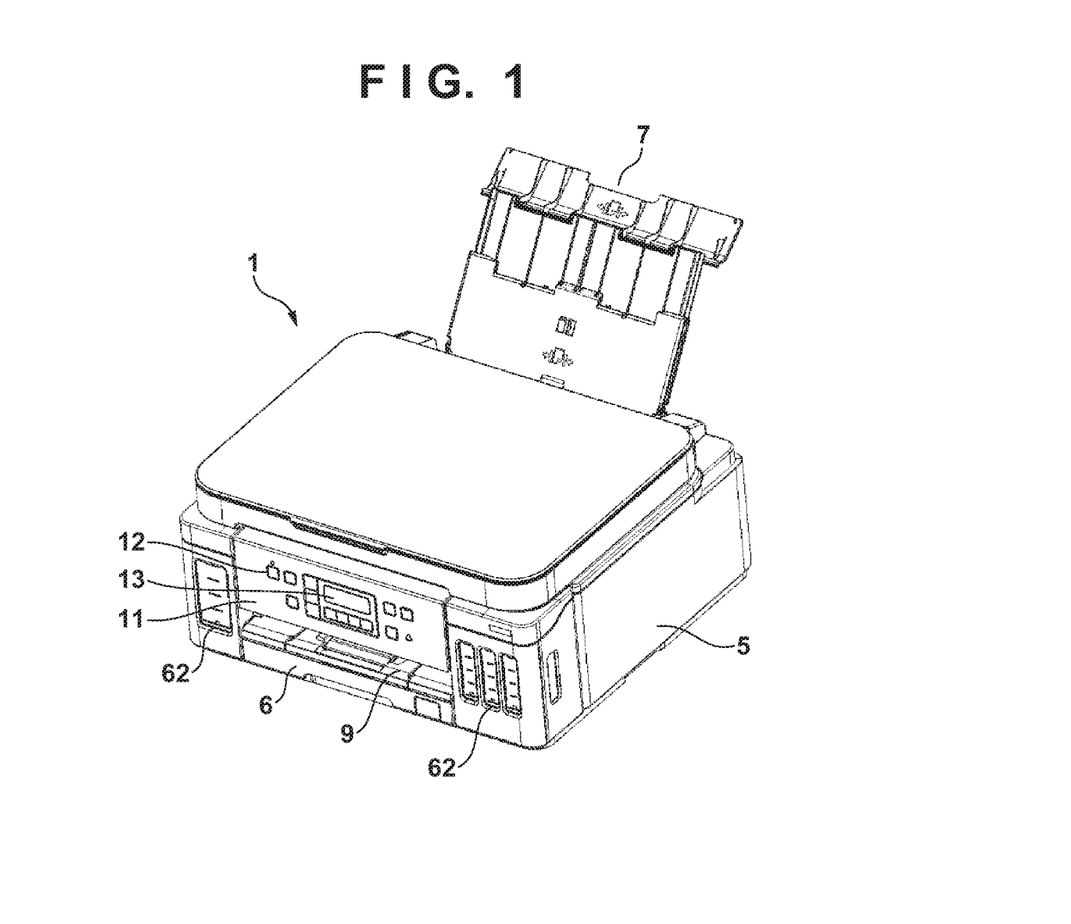
FIG. 1 is an external perspective view showing a printing apparatus according to a first embodiment of the present invention.

FIG. 1 is an external perspective view showing an ink jet printing apparatus 1 according to the first embodiment of the present invention.

As shown in FIG. 1, a display operating unit (an operation panel) 11 is disposed on a front portion of a housing 5 of the printing apparatus 1. The display operating unit 11 can be opened and closed (tilted) relative to the housing 5. The display operating unit 11 is provided with operation members 12 that include, for example, a button used to power on the printing apparatus 1 and a button used to make an instruction to perform a recording operation, and a display unit 13 that includes, for example, a liquid crystal display apparatus for displaying the status of the apparatus, images, and so on. A paper feed cassette 6 in which sheet members such as recording sheets, which are recording media, can be stacked, is detachably attached to a position below the front portion of the housing 5. A paper feed tray 7 on which sheet members that are to be subjected to recording can be stacked is provided in a rear portion of the housing 5. The uppermost sheet is separated from sheet members P provided in the paper feed cassette 6 or the paper feed tray 7, and is conveyed by a paper feed roller 53 via a conveyance path 65, which are used to convey the sheet members P, to a recording position at which recording is performed by a recording head. Ink is ejected from a recording head 60 described below, based on recording information, onto a sheet member that has been conveyed to the recording position, and thus image recording (printing) is performed. The recording medium that has been subjected to recording is discharged to a paper discharge tray 9.

Figure 2A:
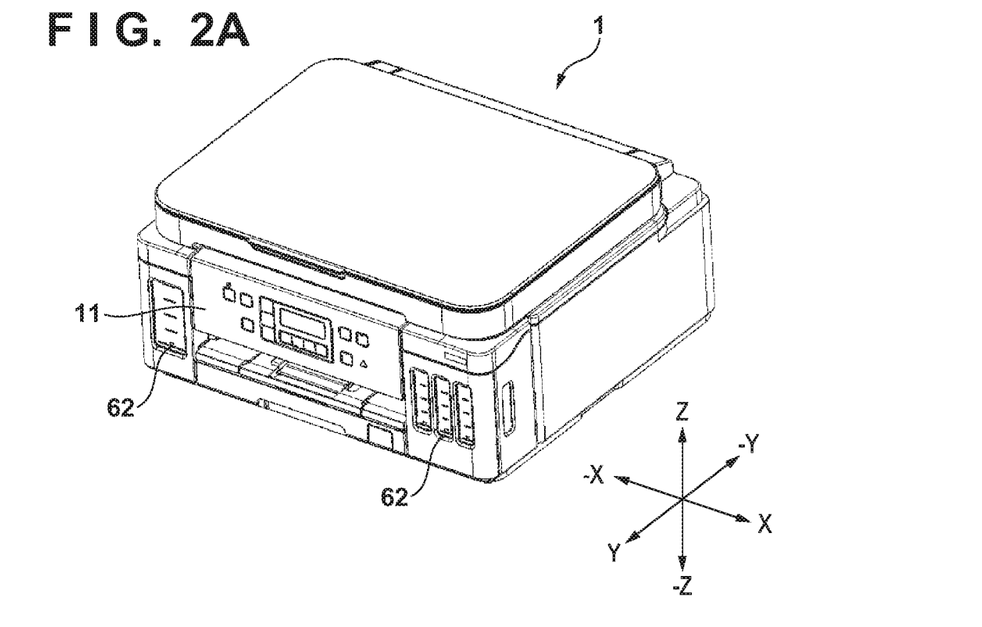
FIGS. 2A and 2B are external perspective views of the printing apparatus according to the first embodiment, showing how a display operating unit is opened and closed.
Figure 2B:
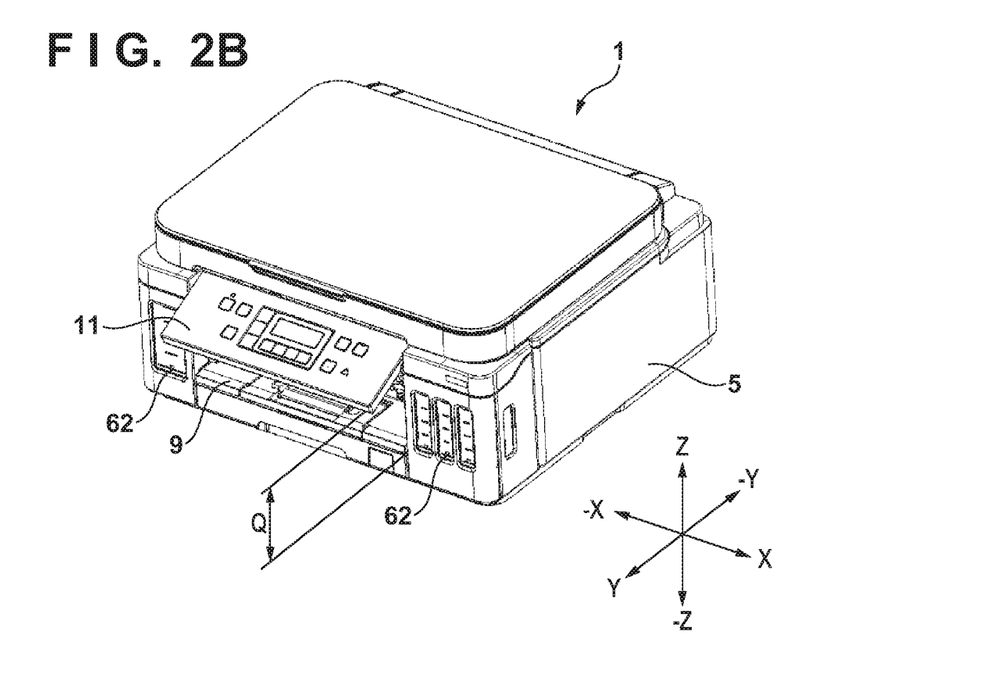

FIGS. 2A and 2B are external perspective views of the printing apparatus 1 according to the present embodiment, showing how the display operating unit 11 is opened and closed. FIG. 2A show a state in which the display operating unit 11 is closed and is located at a first position (a retraction position) where the display operating unit 11 is retracted into the printing apparatus 1. FIG. 2B shows a state in which the display operating unit 11 is open and is located at a second position (a usage position) so that recording to the sheet members P can be performed.

Through a user operation, the display operating unit 11 is pivoted (tilted) about a pivot shaft 14 (see FIGS. 5A to 5C) at the upper end thereof, and thus the display operating unit 11 transitions from the state shown in FIG. 2A to the state shown in FIG. 2B. The display operating unit 11 is provided with a tilt mechanism 100 (see FIGS. 5A to 5C) that has a plurality of stop positions (tilt positions) described below. The user can adjust the tilt angle of the display operating unit 11 to a preferable angle by selecting one of the plurality of stop positions and stopping the display operating unit 11 at the selected position. As a result of the display operating unit 11 being pivoted by the user and being moved to the usage position, which is the second position, an opening portion Q from which a sheet member can be discharged is formed between the display operating unit 11 and the paper discharge tray 9 as shown in FIG. 2B. In the present embodiment, a sheet member P that has been subjected to recording can be discharged only after the opening portion Q is formed, and recording can only be performed on the recording medium in the state shown in FIG. 2B.

Note that, in order to perform recording on a sheet member P, the display operating unit 11 need be open to at least the position shown in FIG. 2B. Therefore, in the present embodiment, the position in the state shown in FIG. 2B is the most closed position of the usage positions of the display operating unit 11, and the tilt mechanism 100 described above is configured to be able to be stopped at any of a plurality of angle positions at which the display operating unit 11 is more open than at the position shown in FIG. 2B.

The printing apparatus 1 is provided with a detection mechanism that detects the tilt angle of the display operating unit 11. The detection mechanism can be realized using, for example, a mechanical switch with a resistance value that changes depending on the stop position of the display operating unit 11. Instead of a mechanical switch, an electrical configuration that employs a position sensor, a photointerrupter, or the like may be used to realize the detection mechanism.

Figure 3:
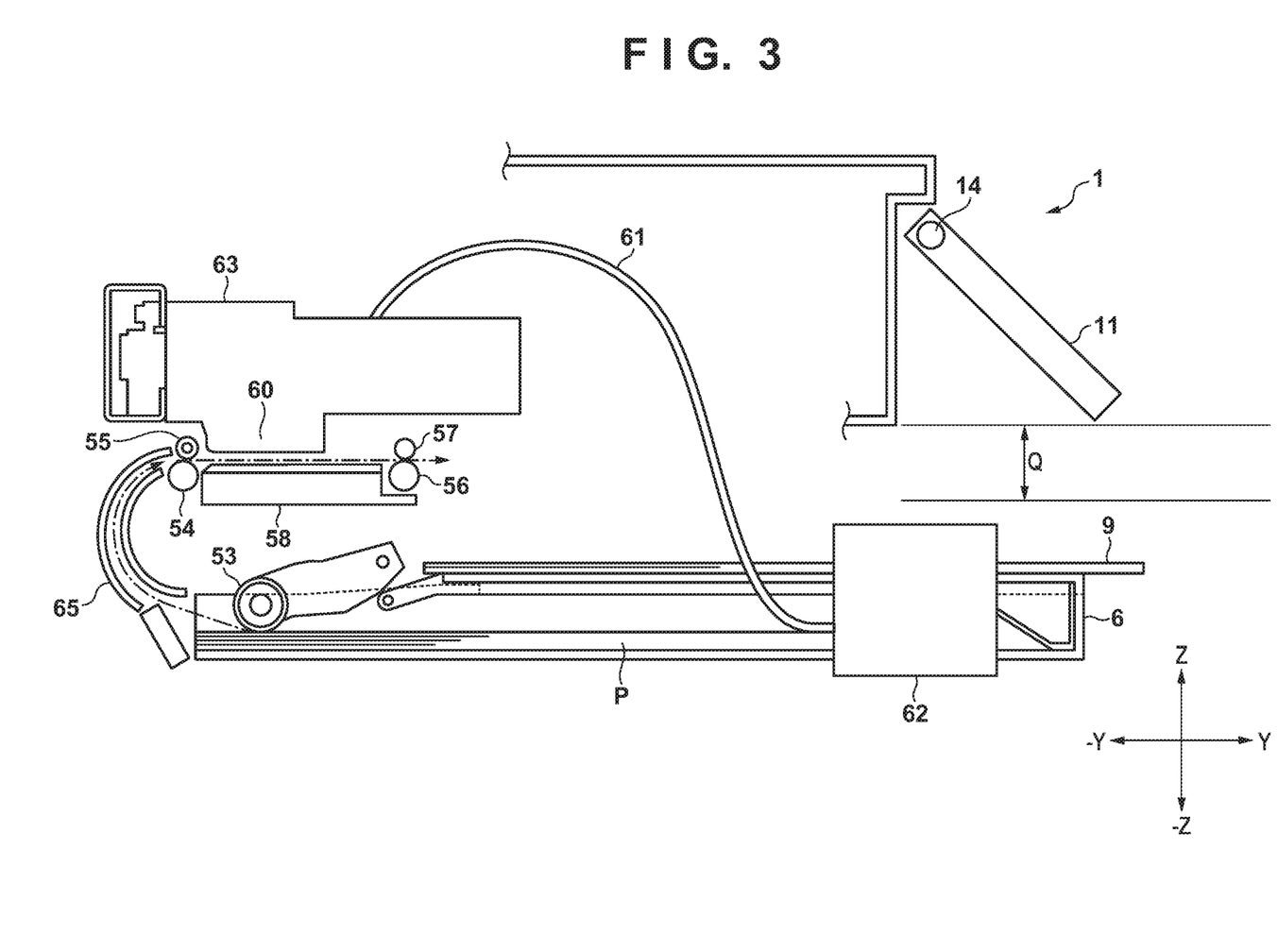
FIG. 3 is a schematic diagram showing an internal configuration of the printing apparatus according to the first embodiment.

FIG. 3 is a schematic diagram showing an internal configuration of the printing apparatus 1 according to the present embodiment. The sheet members P stacked in the paper feed cassette 6 in the printing apparatus 1 are fed one by one by the paper feed roller 53 to a position between a conveyance roller 54 and a pinch roller 55 while being guided by a paper guide 65. Thereafter, each sheet member P is conveyed while being supported by a platen 58 from below, and ink is ejected from the recording head 60 held by a carriage 63, onto the sheet member P. A sheet member P that has been subjected to the recording performed by the recording head 60 is sent to a position between a paper discharge roller 56 and a spur 57, and is further conveyed to be discharged onto the paper discharge tray 9.

Typically, the recording head 60 is supplied with ink from an ink cartridge held by the carriage 63, and performs recording to the sheet member P. However, in the present embodiment, large-capacity ink tanks 62 are disposed in the housing 5 of the printing apparatus 1, and ink is supplied from the large-capacity ink tanks 62 to the recording head 60 via a tube 61. As shown in FIGS. 2A and 2B, the large-capacity ink tanks 62 are respectively disposed on both sides of the front portion of the housing 5. With this configuration in the present embodiment, a space that extends in the front-rear direction is required so that the large-capacity ink tanks 62 can be disposed. Therefore, in the present embodiment, the display operating unit 11 is disposed between the left and right large-capacity ink tanks 62, and the tilt mechanism 100 of the display operating unit 11 described above is disposed utilizing the space that extends in the front-rear direction and is required by the large-capacity ink tanks 62.

Figure 4:
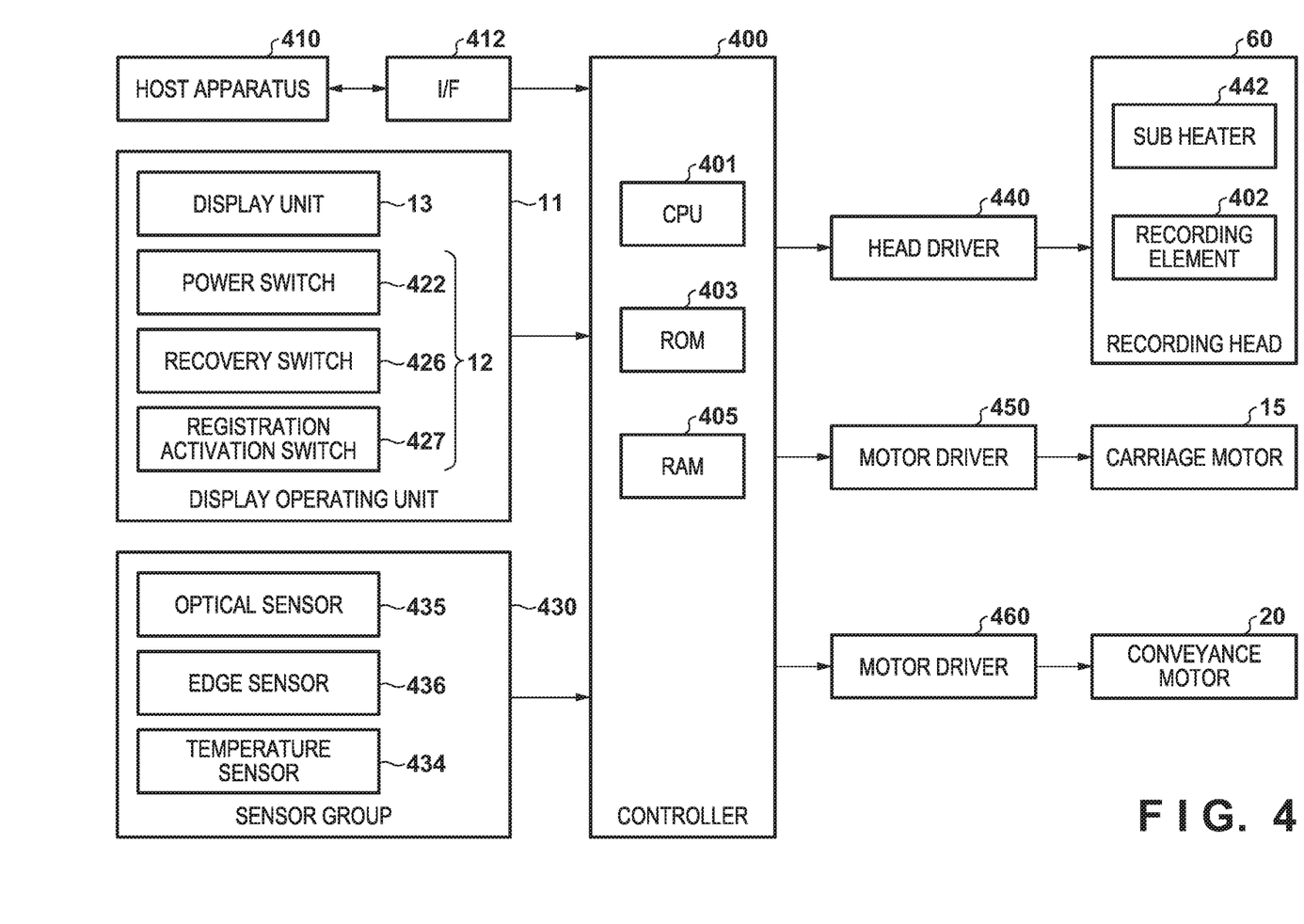
FIG. 4 is a block diagram showing an electrical configuration of the printing apparatus according to the first embodiment.

FIG. 4 is a block diagram showing an electrical configuration of the printing apparatus 1 according to the present embodiment.

A controller 400 includes, for example, a CPU 401, which is a microcomputer, a ROM 403 that stores a program, a predetermined table, and other fixed data, and a RAM 405 that has an area onto which image data can be loaded, a work area, and so on.

A host apparatus 410 is the supply source of image data connected to the printing apparatus 1, and is a personal computer (PC) that generates image data and performs processing, for example, a scanner apparatus for reading images, a digital camera, or the like. Image data, other commands, status signals, and so on are transmitted to and received from the controller 400 via an interface (I/F) 412.

The display operating unit 11 includes the operation members 12 for receiving an instruction input by the user, and the display unit 13. The operation members 12 include, for example, a power switch 422, a recovery switch 426 used to make an instruction to perform a maintenance operation on the recording head 60, a registration adjustment activation switch 427 used by the user to input a command when a registration adjustment mode is to be executed.

The printing apparatus 1 includes an optical sensor 25A, an edge sensor 436, a temperature sensor 434, and so on mainly in order to detect the position and edge of a sheet member P.

The controller 400 controls a recording element 402 that is disposed in the recording head 60, and a head driver 440 for driving a sub heater 442, thereby controlling the ink ejection operation of the recording head 60.

The controller 400 also controls a motor driver 450 that drives a carriage motor 15, thereby controlling the position of the recording head 60 relative to a sheet member P, and controls a motor driver 460 that drives a conveyance motor 20, thereby controlling an operation performed to convey a sheet member P.

Figure 5A:
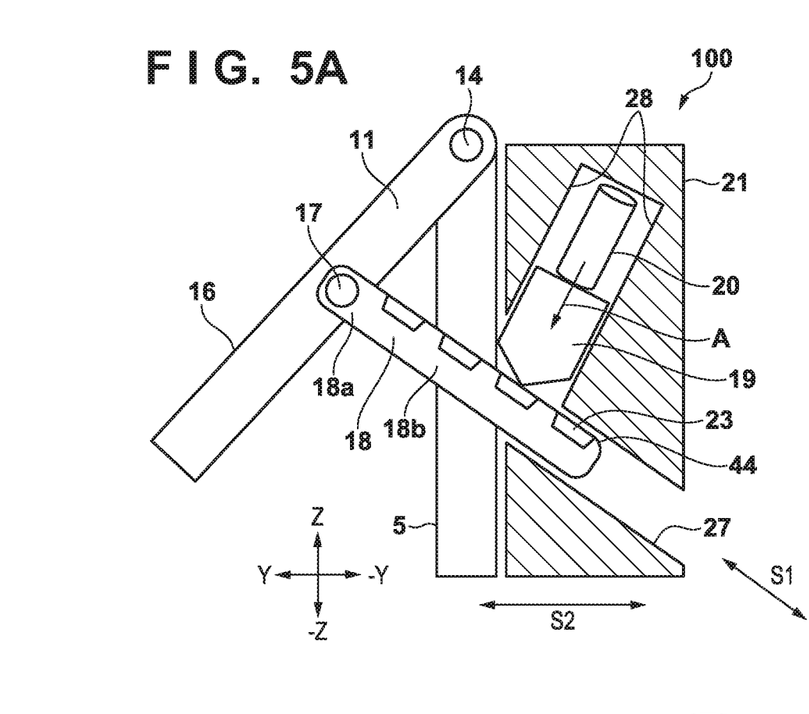
FIGS. 5A to 5C are schematic cross-sectional views according to the first embodiment, showing a tilt mechanism of the display operating unit.
Figure 5B:
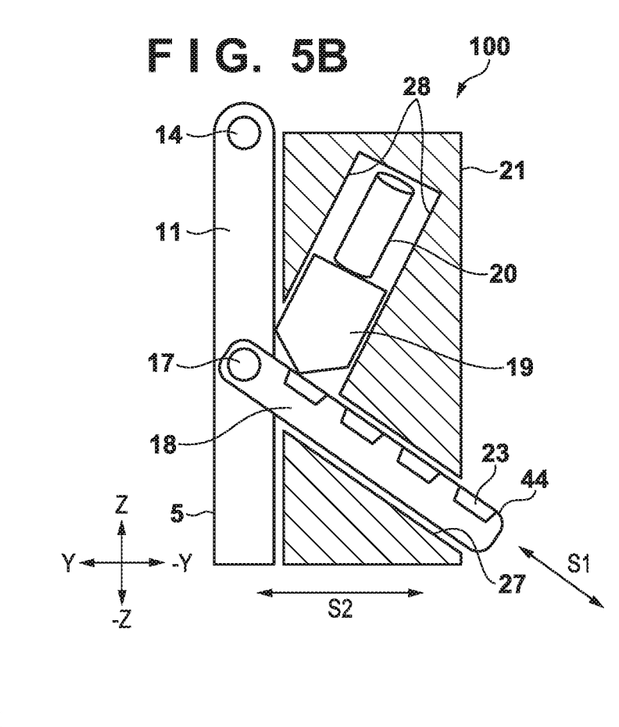
Figure 5C:
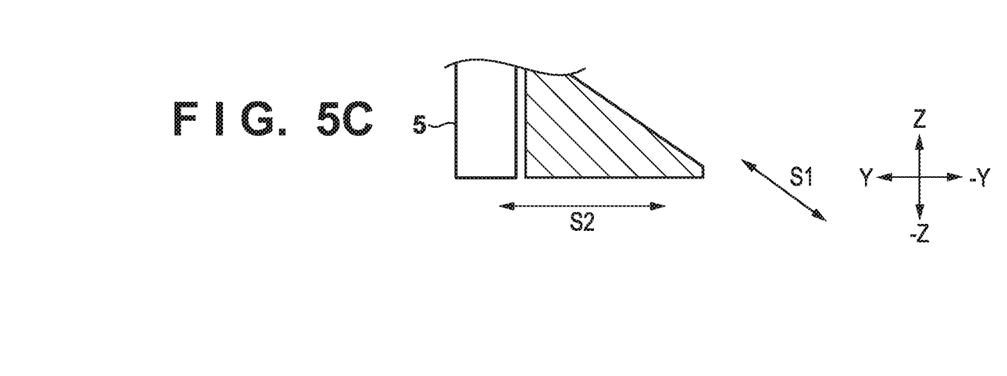

FIGS. 5A to 5C are schematic cross-sectional views according to the present embodiment, showing the tilt mechanism 100 of the display operating unit 11. More specifically, FIGS. 5A to 5C are cross-sectional views of the display operating unit 11 taken long the YZ plane, and show a portion corresponding to the tilt mechanism 100 of the display operating unit 11. FIG. 5A shows a state in which the display operating unit 11 is open, and FIG. 5B shows a state in which the display operating unit 11 is closed. FIG. 5C shows a lower portion of FIG. 5A.

The display operating unit 11 is provided with the operation members 12 and so on, and therefore in a case where the user presses a button or the like disposed on an operation face 16, a force is applied to the display operating unit 11 in the direction in which the display operating unit 11 is closed. In such a case, the tilt mechanism 100 needs to hold the display operating unit 11 such that the current tilt angle of the display operating unit 11 does not change.

Therefore, in the present embodiment, the display operating unit 11 is not supported relative to the housing 5 only using a first shaft 14, which is at the center of rotation of the display operating unit 11, but the display operating unit 11 is supported by a stopper (a slide member) 18 that is located at a substantially central point of the display operating unit 11 (at a position that is away from the first shaft 14 toward the leading end of the display operating unit 11 by a predetermined distance). A leading end portion (one end portion) 18a of the stopper 18 is pivotably coupled to a second shaft 17 that is located at a substantially central point of the display operating unit 11. A cam face 44 is formed on a surface of a body 18b of the stopper 18, and the leading end of a pressing member 19 is biased toward this face (in the direction indicated by the arrow A), using a compression coil spring 20. Due to this biasing force, the leading end of the pressing member 19 is fitted into one of grooves 23 respectively formed at a plurality of positions on the cam face 44 in the sliding direction thereof, and the stopper 18 stops at the position of the groove 23 (a click position). Thus, the tilt angle of the display operating unit 11 is kept the same. The stopper 18, the pressing member 19, and the compression coil spring 20 are held by a cover member 21 (a guide member) that is fixed to the housing 5. The stopper 18 is guided by a guide face 27 of the cover member 21, and is thus held so as to be slidable in the longitudinal direction thereof. Also, the pressing member 19 is guided by a plurality of guide faces 28 of the cover member 21, and is thus held so as to be slidable in the pressing direction thereof.

When the tilt angle of the display operating unit 11 is to be changed, the user need only apply a force no less than a predetermined value to the display operating unit 11. As a result of the user applying a force to the display operating unit 11 resisting the biasing force of the compression coil spring 20, the leading end of the pressing member 19 moves away from the groove 23 of the stopper 18 along the cam face 44, and the keeping of the tilt angle is released.

By holding the display operating unit 11 as described above, a triangle is formed by the first shaft 14, the second shaft 17, and the groove 23 on the cam face 44. Thus, when the display operating unit 11 is open, a triangle, which is stable even when an external force is applied thereto, is formed, and the tilt angle of the display operating unit 11 can be kept the same even when a key operation or the like is performed thereon.

Note that, if the priority is to keep the angle of the display operating unit 11 the same, the second shaft 17 is preferably located at the leading end of the display operating unit 11 away from the first shaft 14. However, if the second shaft 17 is located at the leading end of the display operating unit 11, the stopper 18 is elongated and requires a large space, which increases the size of the apparatus. Therefore, considering keeping the angle of the display operating unit 11 the same and downsizing the apparatus, it is desirable that the second shaft 17 is located at a substantially central point of the display operating unit 11.

Figure 6A:
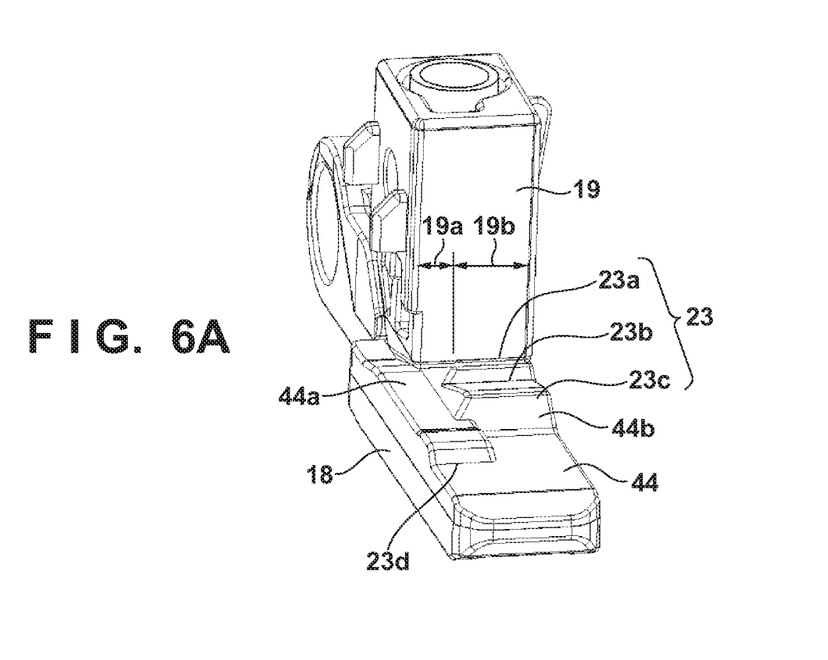
FIGS. 6A and 6B are diagrams showing a stopper taken out of the tilt mechanism.
Figure 6B:
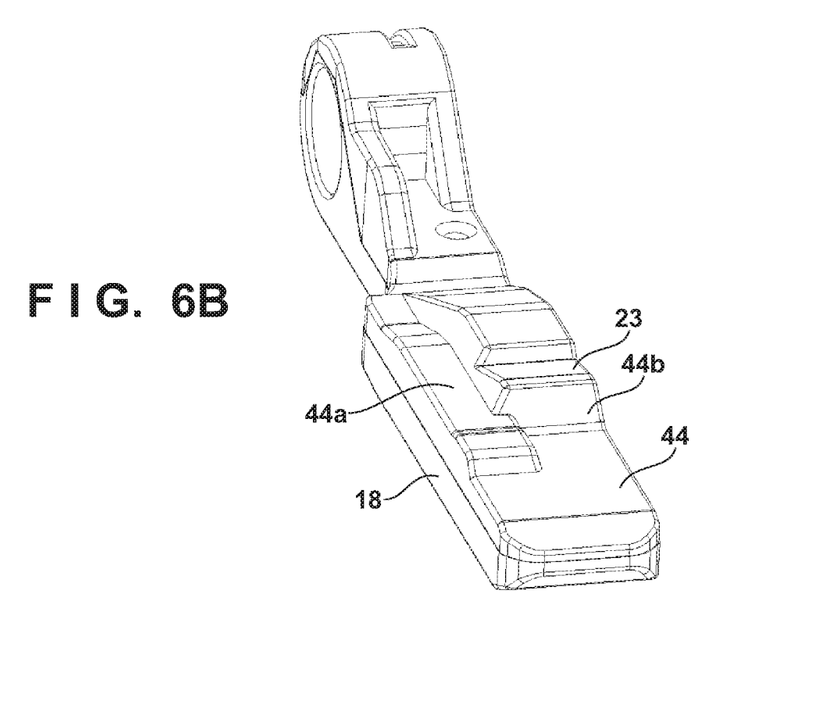

FIGS. 6A and 6B are diagrams showing the stopper 18 taken out of the tilt mechanism 100. FIG. 6A shows the stopper 18 and the pressing member 19, and FIG. 6B only shows the stopper 18.

In FIGS. 6A and 6B, cam faces (divided cam faces) 44a and 44b, which are divided in the width direction (the shorter direction) of the stopper 18 orthogonal to the sliding direction thereof, are formed (present) on the cam face 44 of the stopper 18. The contact portion of the pressing member 19, which comes into contact with the cam face, has a width that spans the cam faces 44a and 44b.

If the user repeatedly performs an operation to open and close the display operating unit 11, the pressing member 19 and the stopper 18 are worn by the friction generated on the cam face 44, which changes the operation force that is applied to tilt the display operation unit 11. Changing of the operation force is not desirable because such changing degrades operability. Therefore, in the present embodiment, the cam face 44 that abut against the pressing member 19 is divided into two faces, namely the cam face 44a and the cam face 44b, and the grooves 23 are arranged at different positions thereof. Also, as described above, the pressing member 19 has a width that spans the cam faces 44a and 44b.

More specifically, a groove 23a, a groove 23b, and a groove 23c are formed in the cam face 44b, the groove 23a corresponding to the most closed position of the display operating unit 11 (the position where the opening portion Q shown in FIG. 2B is formed), the groove 23b corresponding to the second most closed position, and the groove 23c corresponding to the third most closed position. On the other hand, a groove 23d corresponding to the fourth most closed position (the most open position) of the display operating unit 11 is formed in the cam face 44a. When the display operating unit 11 is located at the most closed position, the second most closed position, or the third most closed position, the leading end of the pressing member 19 is in contact with the cam face 44b, but the cam face 44a is located away from the leading end of the pressing member 19.

If the cam face 44 is formed in such a manner, the following effects can be achieved. First, when the display operating unit 11 is located at the most closed position, the second most closed position, or the third most closed position, only a portion that has the width indicated by 19b of the pressing member 19 slides on the cam face 44b, and a portion that has the width indicated by 19a of the pressing member 19 does not slide on the cam face 44a. When the display operating unit 11 is located at the most open position, only the portion that has the width indicated by 19a of the pressing member 19 slides on the cam face 44a, and the portion that has the width indicated by 19b of the pressing member 19 does not slide on the cam face 44b. That is to say, the leading portion of the pressing member 19 slides on a different portion depending on the tilt angle (the opening position) of the display operating unit 11. Therefore, it is possible to disperse the wear of the pressing member 19.

Also, the cam face 44b has grooves corresponding to three stop positions, and the cam face 44a has a groove corresponding to only one stop position. Therefore, the portion that has the width indicated by 19b of the pressing member 19, which slides on the cam face 44b, more frequently slides than the other portion slides. Therefore, in the present embodiment, the width of the cam face 44b and the width indicated by 19b of the pressing member 19 are set to be larger than the width of the cam face 44a and the width indicated by 19a of the pressing member 19. Thus, it is possible to make the wear of the leading end of the pressing member 19 uniform.

Due to the above-described effects, with the present embodiment, even if the user repeatedly performs an operation to open and close the display operating unit 11 while the product is used for a long time, the operation force does not change. Thus, a stable operation force can be realized.

Furthermore, as shown in FIG. 5C, the stopper 18 moves in the direction indicated by an arrow S1 instead of moving in the horizontal direction of the apparatus. Therefore, the tilt mechanism 100 can be downsized in the direction indicated by an arrow S2.

Although three grooves are formed in the cam face 44b and one groove is formed in the cam face 44a in the above-described embodiment, the present invention is not limited to such a configuration, and the number of grooves arranged in the cam faces 44a and 44b can be freely determined. Also, although three successive grooves are formed in the cam face 44b in the above-described embodiment, grooves may be alternatingly arranged on the cam face 44b and the cam face 44a. Furthermore, although the above embodiment describes a case in which the cam face 44 is divided into two cam faces, the cam face 44 may be divided into three or more cam faces.

Figure 7:
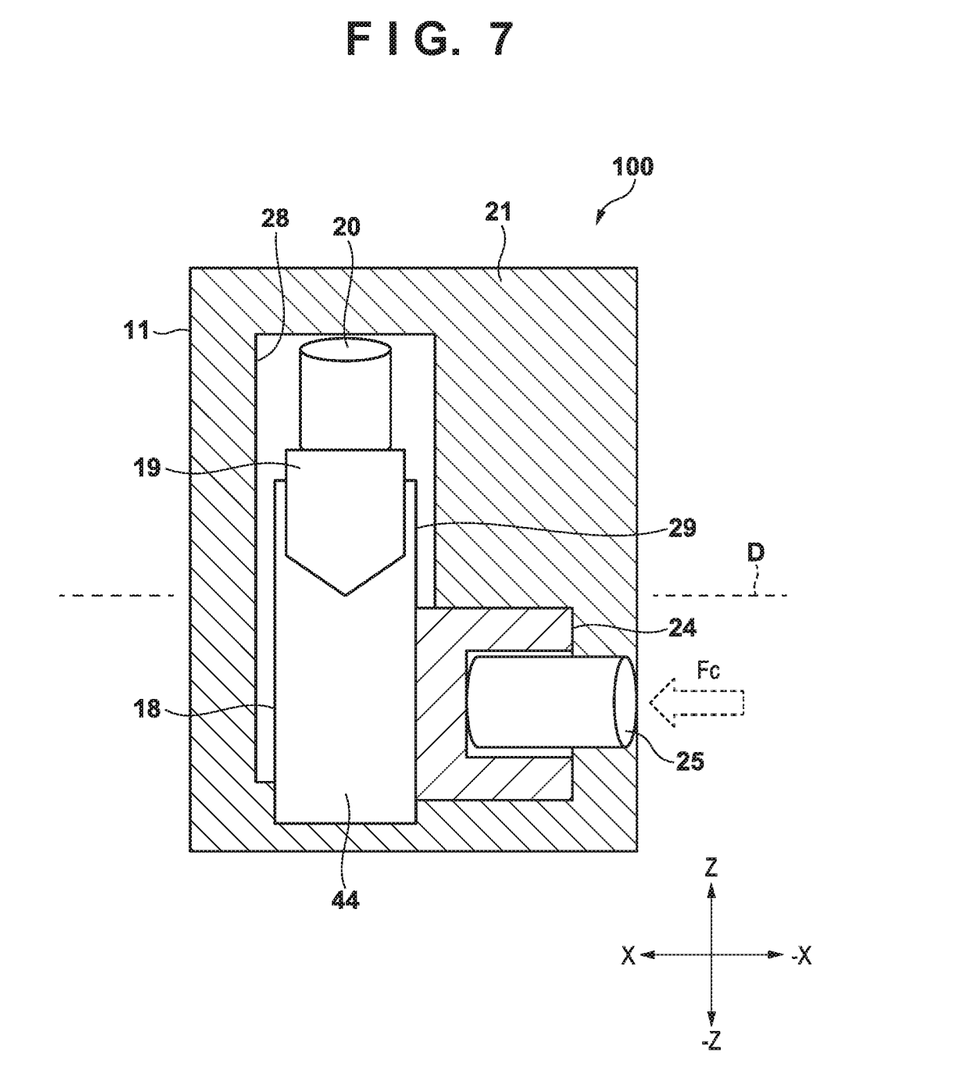
FIG. 7 is a schematic diagram according to the first embodiment, showing the tilt mechanism viewed from the rear side.

FIG. 7 is a schematic diagram showing the tilt mechanism 100 according to the present embodiment viewed from the rear side. In the present embodiment, not only the biasing force of the pressing member 19, but also a biasing force (pressing force) that is applied in a second biasing direction that is different from a first biasing direction (the direction indicated by the arrow A in FIGS. 5A to 5C), which is the biasing direction of the pressing member 19, is applied to the stopper 18. The following describes the second biasing direction.

A pressing member 24 is in contact with a face 29 that is different from the cam face 44 of the stopper 18 to which the biasing force of the pressing member 19 is applied, and the pressing member 24 is biased by a compression coil spring 25 in a direction indicated by an arrow Fc. More specifically, the pressing member 24 is in contact with a side face 29 of the cam face 44 of the stopper 18, and presses the stopper 18 from the side face. The stopper 18, the pressing member 24, and the compression coil spring 25 are held by the cover member 21 that is fixed to the housing 5. The pressing member 24 and the compression coil spring 25 can move in the direction indicated by the arrow Fc while being guided by the cover member 21.

To keep the tilt angle of the display operating unit 11 the same, the friction generated by the biasing force of the pressing member 24 applied to the stopper 18 is used as well as the biasing force of the pressing member 19, and the friction serves to brake the stopper 18. As a result, the tilt angle of the display operating unit 11 can be kept the same even if the biasing force of the pressing member 19 is slightly reduced, and the wear of the pressing member 19, the stopper 18, and the pressing member 24 can be further reduced.

Figure 8:
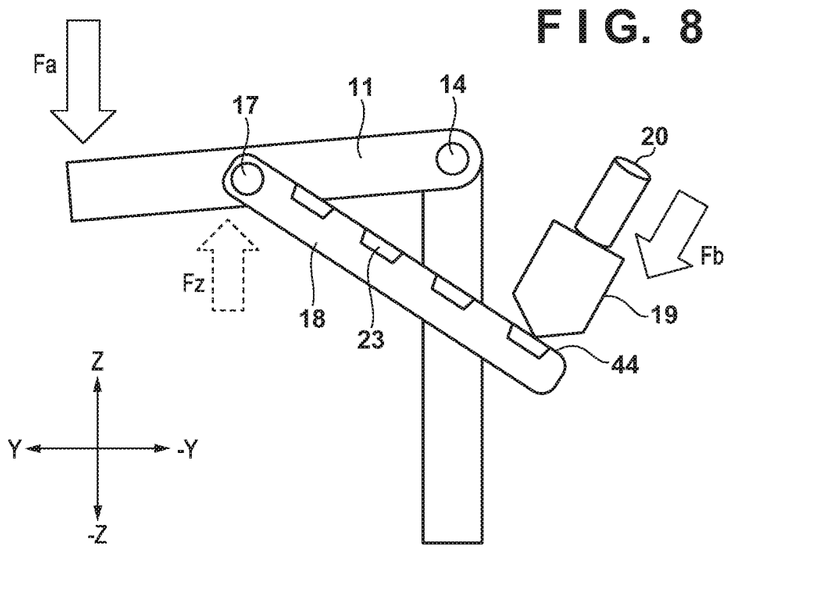
FIG. 8 is a diagram showing a relationship between forces when the tilt position of a display operating unit in the tilt mechanism is kept at the same position.

FIG. 8 is a diagram showing a relationship between forces when the tilt position of the display operating unit 11 in the tilt mechanism 100 is kept at the same position.

In the present embodiment, as already described above, the display operating unit 11 is not only supported by the first shaft 14, but also supported by the stopper 18 at a substantially central point of the display operating unit 11 (a position located at a substantially central point of the distance between the upper end portion and the lower end portion). Furthermore, as shown in FIG. 7, due to the force Fc applied by the pressing member 24 to the stopper 18, a friction force that brakes the movement of the stopper 18 is generated between the stopper 18 and the cover member 21. As a result, a force Fz that supports the display operating unit 11, which is the total of a force Fb and the force Fc (see FIG. 7) applied from the pressing member 19 and the pressing member 24, is applied against the force Fa applied to the display operating unit 11 by the user operating a button or the like. Thus, it is possible to reliably keep the tilt angle of the display operating unit 11 the same.

Figure 9:
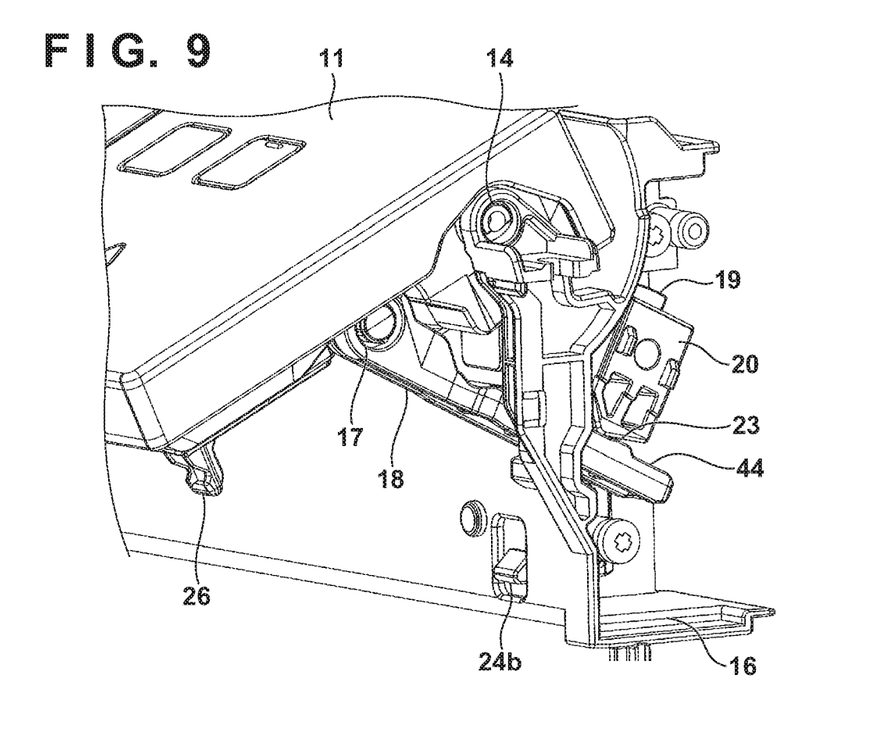
FIG. 9 is a diagram according to the first embodiment, showing a schematic configuration of a lock mechanism when the display operating unit is to be closed.

FIG. 9 is a diagram according to the present embodiment, showing a schematic configuration of a lock mechanism when the display operating unit 11 is to be closed. When the display operating unit 11 is moved to the closed position, a lock portion 26 that is provided on a lower portion of the display operating unit 11 and a lock claw 24b that is provided on the pressing member 24 engage with each other. With this configuration, when moving the display operating unit 11 to the closed position (the retraction position), the user can feel a click indicating that the display operating unit 11 is reliably locked at the closed position.

Second Embodiment

The first embodiment describes a configuration in which, as shown in FIG. 7, the pressing member 24 applies a force to the stopper 18 from a side face, thereby generating a friction force that brakes the stopper 18, between the stopper 18 and the cover member 21. However, in a case where the display operating unit 11 is to be locked at the retraction position, when the display operating unit 11 is finally pressed and fitted to the lock position, such a friction force generated by the pressing member 24 works as a reaction force that biases the display operating unit 11 in a direction in which the display operating unit 11 opens, and the display operating unit 11 may be unable to be reliably locked. To prevent the occurrence of such a reaction force, it is preferable that the biasing force of the pressing member 24 applied to the stopper 18 is temporarily released when the display operating unit 11 is finally pressed and fitted to the lock position. A second embodiment describes a configuration in which the biasing force of the pressing member 24 can be temporarily released.

Figure 10A:
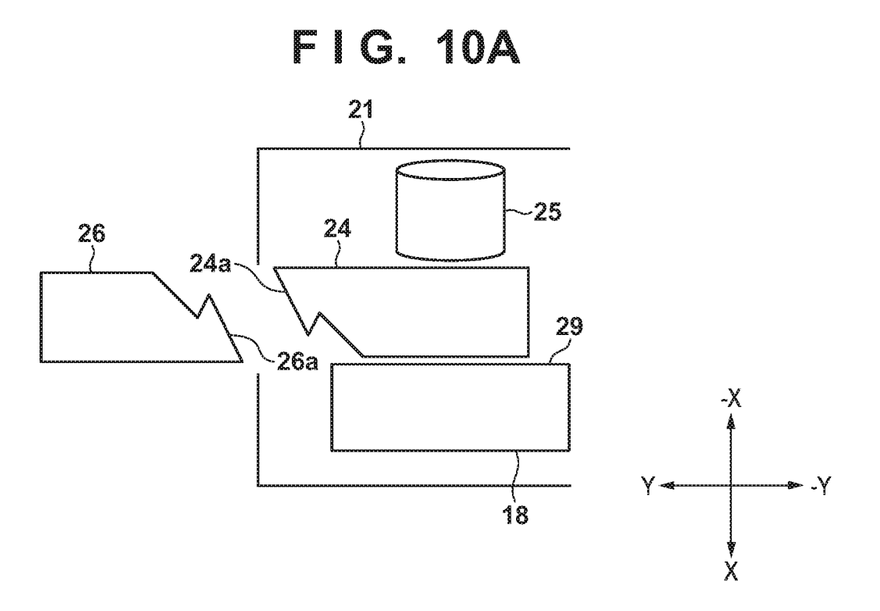
FIGS. 10A and 10B are schematic diagrams according to a second embodiment, showing a friction release mechanism when a display operating unit is to be closed.
Figure 10B:
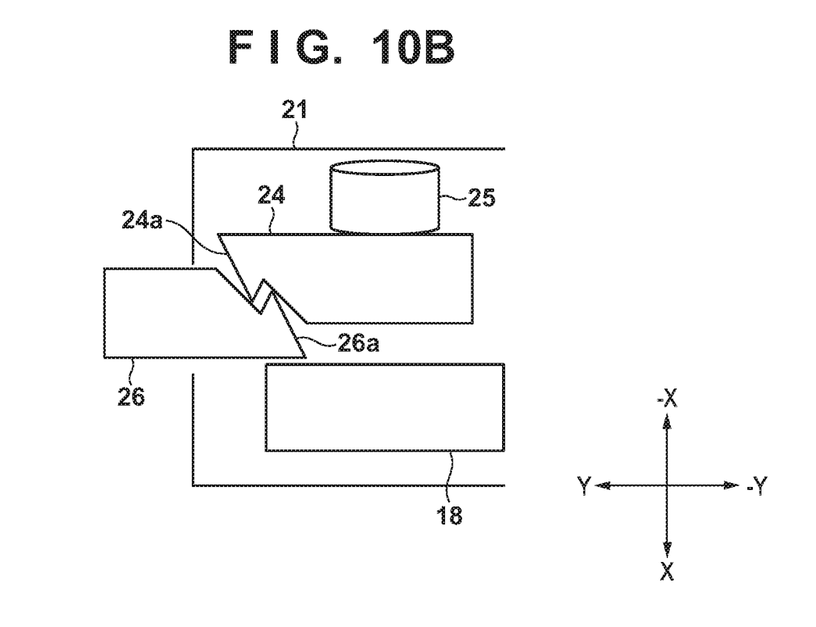

FIGS. 10A and 10B are schematic diagrams according to the second embodiment, showing a friction release mechanism when the display operating unit 11 is to be closed. FIGS. 10A and 10B are cross-sectional views of the display operating unit 11 taken along the plane indicated by a dotted line D in FIG. 7 (the XY plane), viewed in the -Z direction.

In FIGS. 10A and 10B, an inclined face 26a is formed on the leading end portion of the lock portion 26, and an inclined face 24a is formed on the leading end portion of the lock claw 24b of the pressing member 24. When the display operating unit 11 in the state shown in FIG. 10A is closed, the pressing member 24 moves away from the side face of the stopper 18 due to the effect of the inclined faces 24a and 26a, and the biasing force applied to the stopper 18 is released, as shown in FIG. 10B. As a result, it is possible to prevent spring back from being caused by the friction force of the pressing member 24 when the display operating unit 11 is to be closed, and the display operating unit 11 can be reliably locked at the closed position.

Although an ink-jet image forming apparatus has been described above as an example of a printing apparatus, electrophotographic image forming apparatus has a similar problem, and the present invention is applicable to image forming apparatuses other than ink-jet image forming apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-072169, filed Apr. 4, 2019 which is hereby incorporated by reference herein in its entirety.

What is claimed is:

1. A printing apparatus comprising:
a main body;
an operation panel configured to pivot about a pivot shaft relative to the main body;
a stopper that has one end pivotably connected to the operation panel, and has a cam face on a surface thereof;
a guide member that is provided on the main body, has a first guide face and a second guide face that is different from the first guide face, and is configured to guide the stopper such that the stopper is slidable in a longitudinal direction of the stopper;
a first pressing member configured to press the stopper against the first guide face while being in contact with the cam face of the stopper; and
a second pressing member configured to come into contact with a face of the stopper different from the cam face, and press the stopper against the second guide face.

2. The printing apparatus according to claim 1, wherein the first pressing member has a contact portion that comes into contact with a first face of the stopper, and
the cam face has a plurality of grooves that are arranged in the longitudinal direction of the stopper, and into which the contact portion of the first pressing member can be fitted.

3. The printing apparatus according to claim 1, wherein the pivot shaft supports an upper end portion of the operation panel so as to be pivotable, and the one end of the stopper is connected to a predetermined position between the upper end portion and a lower end portion of the operation panel.

4. The printing apparatus according to claim 3, wherein the predetermined position is located at a substantially central point of a distance between the upper end portion and the lower end portion.

5. The printing apparatus according to claim 1, further comprising a release mechanism configured to release the second pressing member from pressing the stopper when the operation panel is moved to a closed position relative to the main body.

6. A printing apparatus comprising:
a main body;
an operation panel configured to pivot about a pivot shaft relative to the main body;
a slide member that is disposed so as to be slidable relative to the main body, and supports the operation panel; and
a holding mechanism that holds the slide member at a plurality of positions in a sliding direction,
wherein the holding mechanism has a cam face formed on the slide member, and a first pressing member that is biased toward the cam face, and
the holding mechanism further has a second pressing member that is configured to apply a pressing force in a direction that is different from a pressing direction of the first pressing member, thereby braking the slide member moving in the sliding direction.

* * * * *